June 22, 1943.  A. J. WALT ET AL  2,322,677
APPARATUS FOR PRODUCING MULTI-PLY TUBING
Filed April 19, 1941  3 Sheets-Sheet 1
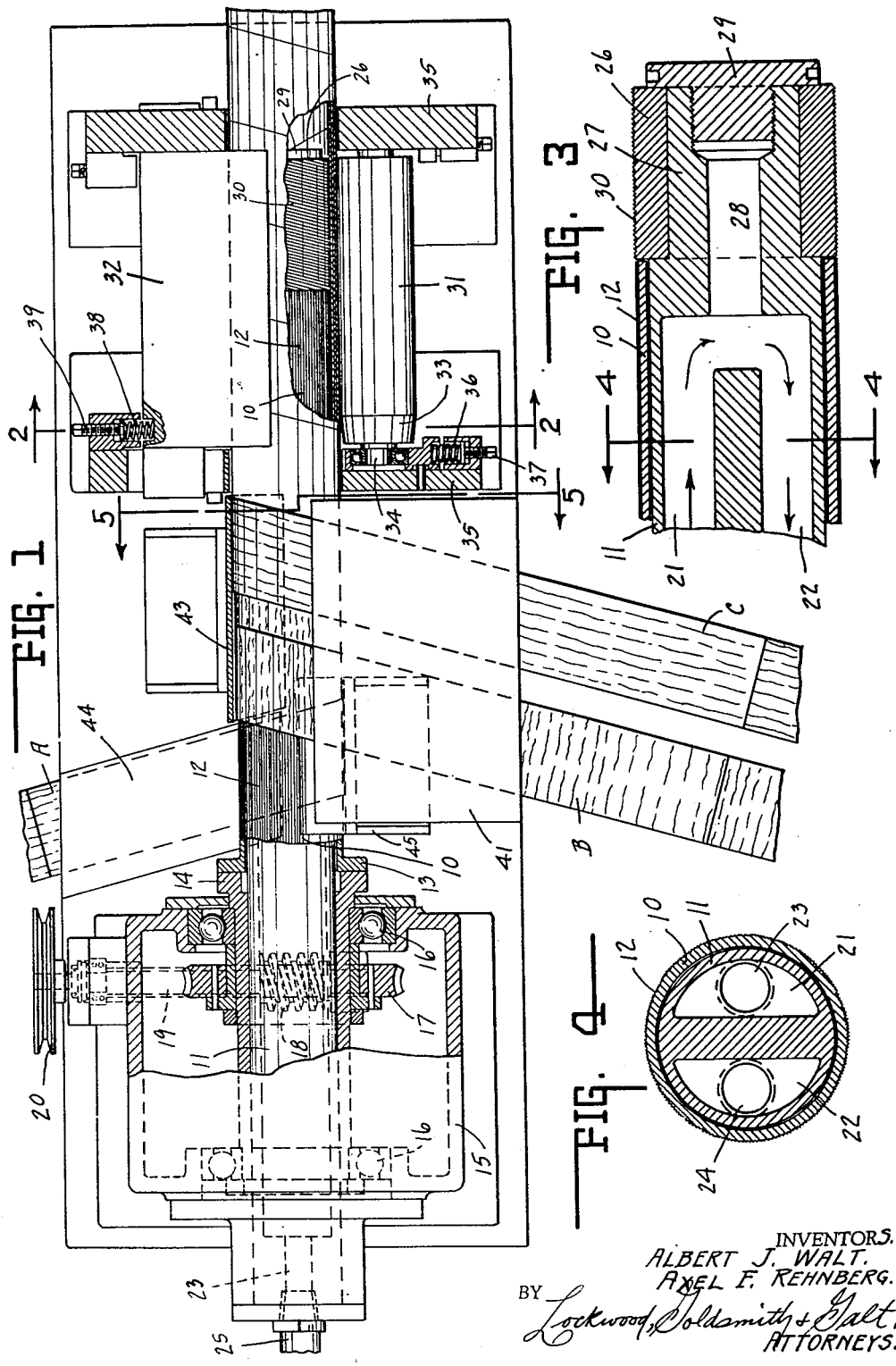
INVENTORS.
ALBERT J. WALT.
AXEL F. REHNBERG.
BY Lockwood, Goldsmith & Galt,
ATTORNEYS.

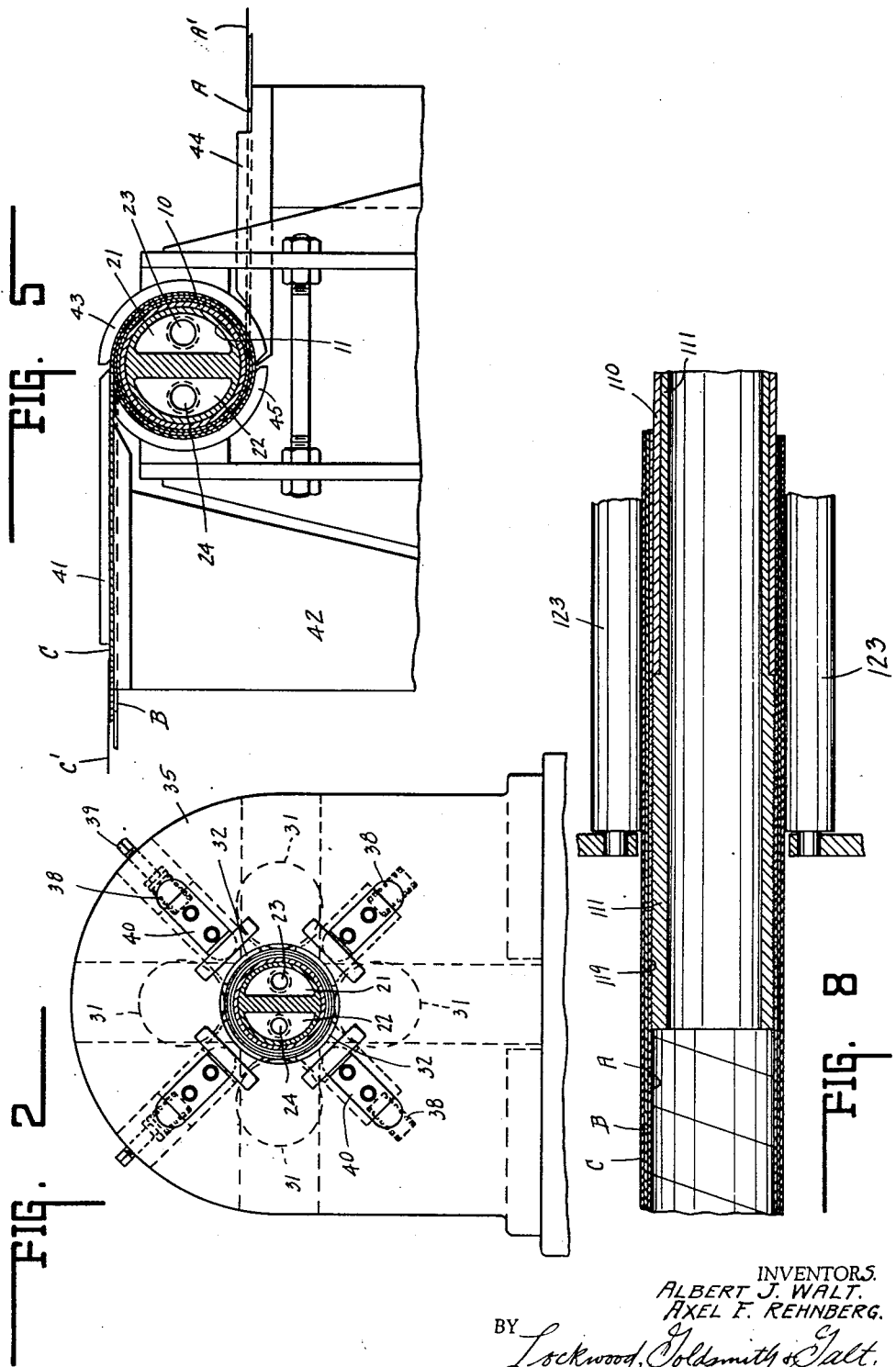

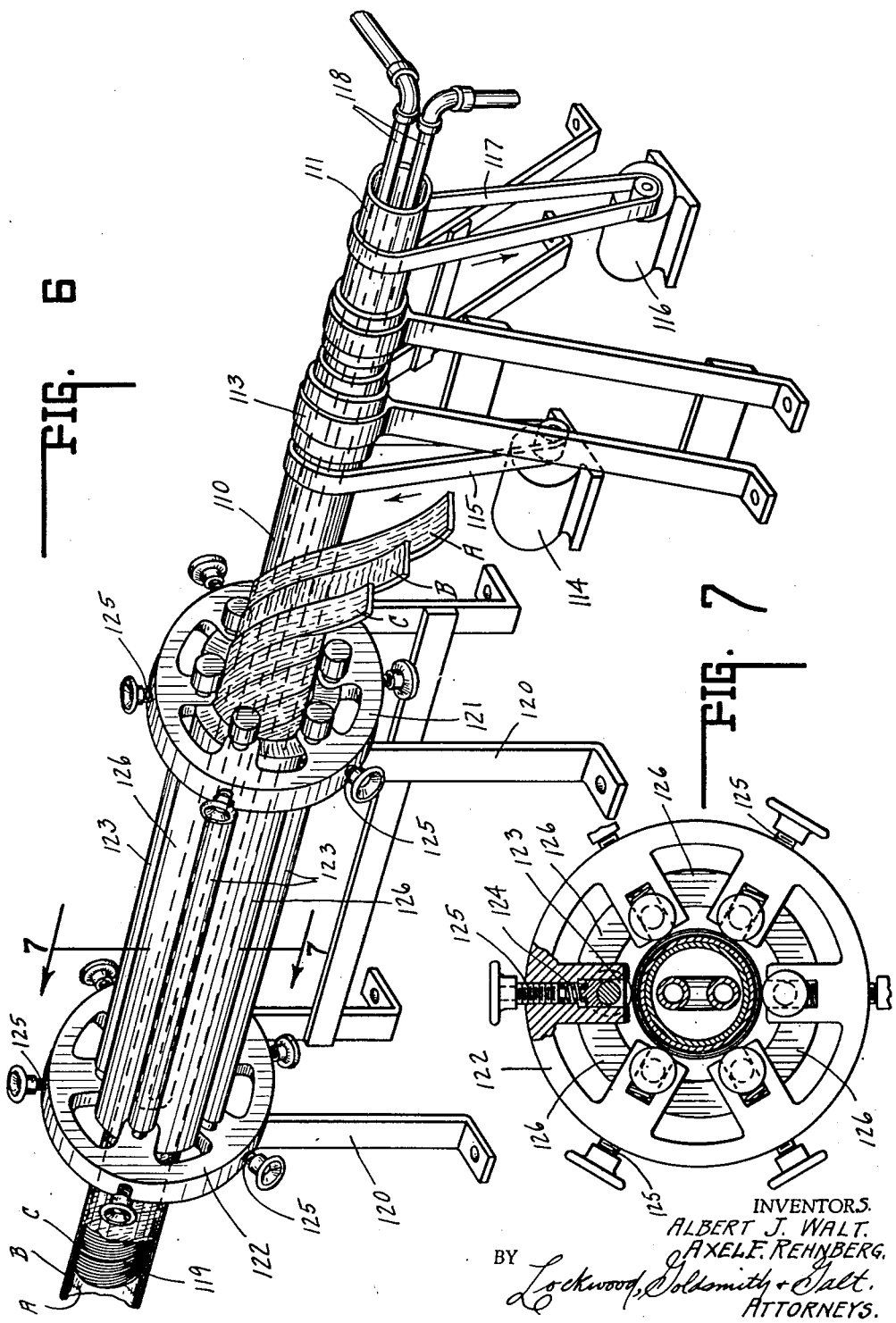

Patented June 22, 1943

2,322,677

UNITED STATES PATENT OFFICE 2,322,677

APPARATUS FOR PRODUCING MULTIPLY TUBING

Albert J. Walt, Aurora, and Axel F. Rehnberg, Rockford, Ill., assignors to The Rudolph Wurlitzer Company, Cincinnati, Ohio, a corporation Application April 19, 1941, Serial No. 389,398

12 Claims. (Cl. 93—80)

This invention relates to an apparatus for use in the production of multi-ply tubing, and particularly the continuous production thereof from spirally wound strips of flexible material.

The object of the invention is to provide a machine in which multi-ply tubing of spirally wound veneer or other flexible material may be continuously and rapidly produced and then cut to the desired lengths, as distinguished from present known methods and apparatus of producing such tubing in individual sections of predetermined length. The tubing thus produced may be of two or more laminations or layers of flexible strips spirally wound about a mandrel, and bonded by a suitable bonding agent, such as a thermosetting resin glue, which bonding agent becomes set upon the simultaneous application of heat and pressure as the flexible windings pass through the machine.

One feature of the invention resides in the provision of means for simultaneously applying the heat and pressure as the spirally wound strips continuously pass through the forming machine. This may be accomplished, for example, as illustrated herein, by the provision of external pressure rollers which, in conjunction with the mandrel upon which the strips are wound, exerts a pressure thereon. Heat may, as illustrated herein, be applied simultaneously with the application of pressure and both internally and externally of the spirally wound strips through the medium of the source of heat within the mandrel, and heating shoes spaced externally about the spirally wound strips.

Another feature of the invention is directed to suitable means to continuously withdraw the formed and set spirally wound tubing from the mandrel and draw or feed the strips thereto. This may be accomplished as herein illustrated by causing relative movement between the formed tubing and an internal feeding screw. Thus, one embodiment of this feature of the invention may effect the feeding of the tubing longitudinally of the mandrel wherein the mandrel and tubing are caused to rotate with the tubing internally engaged by a stationary screw having its screw threads engaging the inner surface of the tubing to slide it longitudinally from the revolving mandrel. On the other hand, the screw threads which engage the internal surface of the tubing may be caused to rotate in the opposite direction from the rotation of the mandrel so as to have substantially the same effect through engagement of the screw threads with the internal surface of the tubing and, therefore, similarly withdraw it from the mandrel.

Another object of the invention resides in the provision of an arrangement adapted to feed the strips to the mandrel with the proper spacing and angular relation. Wherein the tubing is constructed of two or more, preferably three, strips of wood veneer spirally wound one over the other to provide two or more layers, it is desirable that the grain of the veneer be crossed so that the grain in each layer extends at an angle to the grain of the adjacent layer. Wherein the veneer strips are fed to the mandrel for winding in the same direction, the desired cross grain effect may be obtained by providing the intermediate strip of veneer with its grain running substantially at right angles to the grain of the adjacent strips.

The full nature of the invention will be understood from the accompanying drawings and the following description and claims:

Fig. 1 is a plan view of one form of apparatus showing the feeding of the strips from opposite directions, and with the upper pressure roller removed and parts broken away and shown in section for illustration. Fig. 2 is a section taken on the line 2—2 of Fig. 1. Fig. 3 is a longitudinal section through the feeding end of the mandrel screw feed. Fig. 4 is a section taken on the line 4—4 of Fig. 3. Fig. 5 is a section taken on the line 5—5 of Fig. 1 with the gear drive removed. Fig. 6 is a perspective view showing a modified form of machine. Fig. 7 is a section taken on the line 7—7 of Fig. 6 with a portion thereof shown in section. Fig. 8 is a longitudinal section through the feeding end of the modified form shown in Fig. 6.

In the drawings, and having reference to Figs. 1 to 5, inclusive, there is shown a continuously operating multi-ply tube forming machine provided with a cylindrical rotating mandrel 10 which is supported for rotation by a stationary heating core 11. The surface of said mandrel is provided with a series of longitudinal serrations 12 formed about its cylindrical peripheral surface. The driven end thereof is coupled by its driving flange 13 to a flange 14 supported for rotation within the gear housing 15 by the bearings 16. The coupling is driven by a worm gear 17 keyed thereto through a worm 18 driven through a shaft 19 by a driving pulley 20. Said pulley may be driven by any suitable source of power, not shown herein, and which forms no part of this invention.

The heating core 11 about which the mandrel 10 rotates is formed with the conduits 21 and 22, said conduits being in communication at their forward end and terminating at their rear end with the inner opening 23 and outer opening 24. A steam pipe 25 is connected with the opening 23 and a similar steam outlet or drain pipe is connected with the opening 24. Thus, steam or an equivalent heating medium is passed longitudinally of the core 11 for internally heating the mandrel 10 and the strips carried thereby. At the discharge end of the mandrel opposite the driving end, there is provided a screw feed 26 which is stationary and supported upon the reduced end 27 of the core 11. Said reduced end is provided with a passageway 28 arranged to be closed by a screw plug 29. The screw feed 26 is a cylindrical continuation of the mandrel, but is provided with projecting screw threads 30 formed about its periphery for the purpose of feeding the formed tubing from the mandrel as will be hereinafter described.

Surrounding the discharge end of the mandrel and the screw feed there is a series of pressure rollers 31 and external heating shoes 32. Said rollers have their receiving ends tapered as indicated at 33 and are provided with reduced spindles 34 rotatably supported by suitable bearings in the supporting heads 35. Said bearings are slidably mounted in said heads under spring pressure exerted by the compression springs 36 which may be adjusted as to tension by the pressure screws 37, thus causing said rollers to exert the desired pressure against the tubing as it is drawn therethrough. The heating shoes 32 are positioned between the respective rollers and are slidably supported at their opposite ends by the heads 35 so that their arcuate heating surfaces may be maintained in contact with the tubing passing therethrough to apply external heat thereto. For slidably maintaining such contact a light pressure is exerted by the springs 38 which are controlled as to tension by the adjusting screws 39. Each of said heating shoes is provided with a series of heating elements 40 suitably connected with a source of heat which may be in the nature of steam passed therethrough or electric current, as may be desired, the character of heating for said elements forming no part of the invention.

As the mandrel is rotated, a series of flexible strips are fed thereabout for building up a plurality of spirally wound layers. As shown in Figs. 1 and 5, a three-layer tube is formed by feeding the strips B and C over the upper surface of the mandrel at an angle to its axis and feeding a third strip A to the underside thereof in the opposite direction with respect to and at an angle to its axis. The strips B and C are guided onto the mandrel by a guide plate 41 which is supported by the frame work 42 in a horizontal plane tangentially to the upper surface of the mandrel. The strips are guided thereby between the upper surface of the mandrel and the shoe 43 partially embracing the far side of the mandrel so as to direct the strip thereabout.

Similarly, there is provided a guide plate 44 on the opposite side of the mandrel extending horizontally in a plane tangentially to the bottom thereof through which the strip A is directed to the shoe 45 lying on the opposite side of the mandrel to partially embrace its cylindrical surface and guide the strip thereabout. As shown in Fig. 1, said strips are fed about the mandrel at such angle to its axis of rotation as to give the desired pitch of the spiral windings forming the tubing.

In the arrangement illustrated in Fig. 1 the strip A will lie innermost about the mandrel over which the strip B will be wrapped and covered by the wrapping of the strip C. The wrapping will be such that the edges of the respective strips forming the respective layers will abut each other. The strips B and C are shown as spaced apart while feeding so that their abutting edges will be offset and not lie one above the other. Said strips A, B and C when comprising wood veneer may be formed with their veneer grains extending in such direction that the two outer layers will have their grains running in substantially the same direction and opposite to the direction of grain of the intermediate layer. For example, the grains of the veneer strips A and C may extend in the same direction while the grain of the strip B will extend crosswise thereof.

A suitable bonding material, such as a thermosetting resin glue, is applied over the adjacent surfaces of the strips. Said material is preferably applied thereto prior to the winding operation, although suitable provision may be made for applying the glue to the strips as they are wound or approach their winding relation to the mandrel. However, the best practice appears to be to impregnate the proper surface or surfaces of the strips with said glue before the winding operation, allowing the glue to penetrate and become dry. This permits of a much more rapid bonding and setting of the glue upon the application of the heat and pressure as the wound tubing passes under the pressure rolls. It is necessary, however, that the wound tubing readily slide longitudinally of the surface of the mandrel and under the pressure rollers and heating shoes. It, therefore, becomes essential that no glue remain upon the surfaces, such as would gum them and resist the free sliding movement of the formed tubing therealong. This may be accomplished by the proper application of glue to the proper surfaces of the strips. However, the affected surfaces of the machine may be protected by wrapping a lining of paper internally and externally of the formed tubing to prevent any escape of glue therefrom. Thus, as shown in Fig. 5, a paper lining A' may be fed about the mandrel and adjacent its surface with the strip A. Similarly, a paper lining C' may be fed about the exterior of the formed tubing with the strip C.

Due to serrations 12 extending about the periphery of the mandrel, there will be a surface interlocking between the mandrel and wound strips or formed tubing, such as will cause the tubing to be rotated with the mandrel under the pressure rollers and heating shoes. However, the inner surface of the tubing will simultaneously be engaged by the screw threads on the stationary screw feed 26, said threads being formed sharp enough to bite into the inner surface of the tubing and feed it outwardly along the mandrel to discharge it from the machine by reason of the screw pitch of the teeth and the relative movement between the teeth and the tubing. This action has the dual effect of feeding the formed tubing from the machine and spiraling the strips A, B and C about the mandrel.

This operation may be continuous, the formed tubing being cut to length after leaving the machine, it being well understood in the art that the strips A, B and C may be formed continuously from wood veneering of suitable length by butt gluing their ends.

In the modified form of machine shown in Figs. 6 to 9, the serrated mandrel 110 is rotatably supported upon an inner sleeve or heating core 111 having one end further supported within the bearing support 113. The mandrel 110 is rotated in one direction (see arrows) by the motor 114 driving it through the belt and pulley drive 115. The bearing sleeve 111 is driven in the opposite direction (see arrows) by the motor 116 through the belt and pulley drive 117. The bearing sleeve 111 is provided with a heating unit, such as the steam pipes 118, extending therein for the purpose of internally heating the mandrel. At the opposite end of the bearing sleeve 111 there is provided a feed screw 119 which rotates therewith, and is of the same outer diameter as the mandrel 110. Said feed screw is provided with a series of sharpened and biting screw threads of proper pitch adapted to engage the inner surface of the formed tubing and by reason of their relative rotation screw the tubing longitudinally of the mandrel.

The mandrel and bearing sleeve are supported at their opposite end by the frame work 120 which supports the heads 121 and 122. Said heads are provided with pressure rollers 123 pivotally mounted therein and to extend therebetween so as to surround the mandrel in spaced relation to employed to initially charge the machine with formed tubing.

The invention claimed is:

1. An apparatus for continuously forming multi-ply tubing comprising a cylindrical mandrel about which a plurality of strips of flexible material are spirally wound, means for rotatably supporting said mandrel, means for rotating said mandrel upon said support to effect the winding of the strips into tubing thereon, a cylindrical feeding member supported in alignment with and as a continuation of said mandrel and having its surface formed with screw threads adapted to engage with the inner surface of the formed tubing, and means on said mandrel operable to engage and rotate the formed tubing thereon relative to said screw threads, whereby said screw threads will effect longitudinal withdrawal of said tubing from the mandrel as it is formed thereon.

2. An apparatus for continuously forming multi-ply tubing, comprising a cylindrical mandrel about which a plurality of strips of flexible material are spirally wound, means for rotating said mandrel to wind said strips into a multi-ply tubtudinal movement of said tubing with respect to the mandrel for discharging it therefrom.

6. An apparatus for continuously forming multi-ply tubing comprising a cylindrical mandrel about which a plurality of strips of flexible material are spirally wound, means for rotating said mandrel to effect the winding of the strips into tubing thereon, a series of pressure rollers mounted externally about the periphery of said mandrel longitudinally thereof adapted to exert an inward radial pressure against the tubing formed on said mandrel, a source of heat within said mandrel for generating heat internally of said tubing, a series of heating elements interposed between said pressure rollers adapted to generate heat exteriorly of and about said tubing, and a screw threaded feeding member mounted at the discharge end of said mandrel having a series of screw threads extending into engagement with the internal surface of said tubing under the heated condition thereof and against the pressure exerted by said rollers, said tubing being rotated relative to said screw threads for effecting longitudinal movement of the tubing on said mandrel and its discharge therefrom.

7. An apparatus for continuously forming multi-ply tubing comprising a cylindrical mandrel about which a plurality of strips of flexible material are spirally wound, means for rotating said mandrel to effect the winding of the strips into tubing thereon, a series of pressure rollers mounted externally about the periphery of said mandrel longitudinally thereof adapted to exert an inward radial pressure against the tubing formed on said mandrel, means for applying heat to said tubing, and a screw threaded feeding member fixedly mounted at the discharge end of said mandrel having a series of screw threads extending into engagement with the internal surface of said tubing under the heated condition thereof and against the pressure exerted by said rollers for effecting longitudinal movement of the tubing on said mandrel and its discharge therefrom.

8. An apparatus for continuously forming multi-ply tubing, comprising a cylindrical mandrel about which a plurality of strips of flexible material are spirally wound, means for rotating said mandrel to wind said strips into a multi-ply tubing, and means associated with said mandrel formed with external screw teeth adapted to extend into engagement with the inner surface of the wound strips thereon operable through relative rotation therebetween to longitudinally feed said tubing from the mandrel.

9. An apparatus for continuously forming multi-ply tubing, comprising a cylindrical mandrel about which a plurality of strips of flexible material are spirally wound, means for rotating said mandrel to effect winding of the strips thereabout, a plurality of serrations formed about the surface of said mandrel and extending longitudinally thereof to grip the inner surface of the strips for drawing them about said mandrel during the winding operation while permitting the formed tubing to slide longitudinally thereof, and a cylindrical member associated with said mandrel having screw teeth formed about the periphery thereof extending into engagement with the inner surface of the wound strips operable through relative rotation therebetween to longitudinally feed said tubing from the mandrel.

10. An apparatus for continuously forming multi-ply tubing comprising a cylindrical mandrel about which a plurality of strips of flexible material are spirally wound, means for rotating said mandrel to effect a winding of the strips ing tubing thereon, a cylindrical feeding member supported in alignment with and comprising a section of the cylindrical surface of the mandrel, and a series of screw threads extending outwardly from said feeding member into operative engagement with the inner surface of the wound strips, said member and tubing having relative rotation therebetween whereby said screw threads are adapted to effect longitudinal movement of the tubing on the mandrel.

11. An apparatus for continuously forming multi-ply tubing, comprising a cylindrical mandrel about which a plurality of strips of flexible material are spirally wound, means for rotating said mandrel to effect the winding of the strips into tubing thereon, a series of pressure rollers mounted externally about the periphery of said mandrel and extending longitudinally thereof adapted to exert an inward radial pressure against the tubing formed on said mandrel, and a screw threaded feeding member mounted in alignment with and as a sectional portion of said mandrel provided with a series of external screw threads adapted to extend into engagement with the internal surface of the strips wound about said mandrel against the pressure exerted by said rollers, said tubing and feeding member being rotated relative to each other for effecting longitudinal movement of the tubing on said mandrel and its discharge therefrom.

12. An apparatus for continuously forming multi-ply tubing comprising a cylindrical mandrel about which a plurality of strips of flexible material are spirally wound, means for rotating said mandrel to effect the winding of the strips in said tubing thereon, a series of pressure rollers mounted externally about the periphery of said mandrel and extending longitudinally thereof adapted to exert an inward radial pressure against the tubing formed on said mandrel, means for applying heat to said tubing while being formed and pressed about said mandrel, and a screw threaded feeding member mounted axially of and as a sectional portion of said mandrel having a series of external screw threads formed thereabout adapted to extend into engagement with the internal surface of said strips under the heated condition thereof and against the pressure exerted by said rollers, said tubing and feeding member having relative rotation whereby the screw threads will effect a longitudinal sliding movement of the tubing over said mandrel to effect its discharge therefrom.

ALBERT J. WALT.
AXEL F. REHNBERG.